United States Patent
Zhang (10) Patent No.: US 10,555,354 B2
(45) Date of Patent: Feb. 4, 2020

(54) SYSTEMS AND METHODS FOR ASSISTING TWO TERMINALS TO ESTABLISH CONNECTIONS THEREBETWEEN

(71) Applicant: BEIJING DIDI INFINITY TECHNOLOGY AND DEVELOPMENT CO., LTD., Beijing (CN)

(72) Inventor: Beibei Zhang, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 15/870,985

(22) Filed: Jan. 14, 2018

(65) Prior Publication Data

US 2018/0160464 A1    Jun. 7, 2018

Related U.S. Application Data

(63) Continuation of application No. PCT/CN2017/083747, filed on May 10, 2017.

(30) Foreign Application Priority Data

Dec. 6, 2016    (CN) .......................... 2016 1 1113978

(51) Int. Cl.
*H04W 76/14* (2018.01)
*H04B 5/00* (2006.01)
(Continued)

(52) U.S. Cl.
CPC .......... *H04W 76/14* (2018.02); *H04B 5/0031* (2013.01); *H04M 1/7253* (2013.01);
(Continued)

(58) Field of Classification Search
CPC .... G01C 21/34; G01C 21/3438; G06Q 10/00; G06Q 10/02; G06Q 10/025; G06Q 10/06;
(Continued)

(56) References Cited

U.S. PATENT DOCUMENTS

| 8,432,260 B2 | 4/2013 | Talty et al. |
| 2006/0059023 A1* | 3/2006 | Mashinsky ............ G06Q 10/02 705/5 |

(Continued)

FOREIGN PATENT DOCUMENTS

| CN | 201166978 Y | 12/2008 |
| CN | 201946299 U | 8/2011 |

(Continued)

OTHER PUBLICATIONS

The extended European search report in European Application No. 17832030.5 dated Sep. 28, 2018, 8 pages.
(Continued)

*Primary Examiner* — Yuwen Pan
*Assistant Examiner* — Paul P Tran
(74) *Attorney, Agent, or Firm* — Metis IP LLC (57) ABSTRACT

The present disclosure relates to systems and methods for assisting two terminals to establish connections therebetween. The systems may perform the methods to receive first electronic signals from a second terminal, the first electronic signals including first structured data encoding terminal information of a first terminal associated with the second terminal; receive second electronic signals including second structured data encoding an identification of a third terminal; and send third electronic signals to the third terminal, the third electronic signals including third structured data encoding the terminal information of the first terminal.

20 Claims, 6 Drawing Sheets

(51) Int. Cl.
*H04M 1/725* (2006.01)
*H04W 8/00* (2009.01)
*H04W 12/08* (2009.01)
*H04W 84/18* (2009.01)
*H04W 4/80* (2018.01)

(52) U.S. Cl.
CPC ............ *H04W 8/005* (2013.01); *H04W 12/08* (2013.01); *H04W 4/80* (2018.02); *H04W 84/18* (2013.01)

(58) Field of Classification Search
CPC ............... G06Q 10/0631; G06Q 10/08; G06Q 10/08355; G06Q 10/833; G06Q 20/10; G06Q 20/145; G06Q 20/327; G06Q 20/42; G06Q 30/0222; G06Q 30/0206; G06Q 30/0283; G06Q 30/0284; G06Q 30/0623; G06Q 30/0629; G06Q 50/10; G06Q 50/30; H04B 5/0031; H04W 76/14; H04W 4/02; H04W 4/046; H04W 4/14; H04W 4/21; H04W 4/42; H04W 4/44; H04W 4/80; H04W 8/005; H04W 12/003; H04W 12/04; H04W 12/08; H04W 84/18; H04W 4/027; G06F 17/30241; G06F 17/3087; G07B 13/00; G07B 15/02; G08G 1/202; H04M 1/7253; H04M 3/42357
USPC ...... 455/414.3, 422.1, 456.3, 518, 519, 520, 455/521; 701/1.1, 49, 400, 465, 487, 701/522, 533, 540; 705/5, 7.13, 13
See application file for complete search history.

(56) References Cited

U.S. PATENT DOCUMENTS

| | | | | |
|---|---|---|---|---|
| 2012/0041675 | A1* | 2/2012 | Juliver | G06Q 10/08 701/465 |
| 2012/0203599 | A1* | 8/2012 | Choi | G06Q 30/02 705/13 |
| 2014/0006631 | A1 | 1/2014 | Meskauskas et al. | |
| 2014/0058896 | A1* | 2/2014 | Jung | G06Q 30/0623 705/26.61 |
| 2014/0067491 | A1* | 3/2014 | James | G06Q 50/30 705/13 |
| 2014/0120829 | A1 | 5/2014 | Bhamidipati et al. | |
| 2014/0351927 | A1 | 11/2014 | Huang et al. | |
| 2015/0248689 | A1* | 9/2015 | Paul | G06O 30/0222 705/14.23 |
| 2015/0271858 | A1 | 9/2015 | Chu et al. | |
| 2016/0277923 | A1* | 9/2016 | Steffey | H04W 12/04 |
| 2017/0034085 | A1* | 2/2017 | Bijor | H04L 51/046 |
| 2017/0039667 | A1* | 2/2017 | Kim | G06F 16/9537 |
| 2017/0358147 | A1* | 12/2017 | Brinig | G07B 15/02 |
| 2018/0070407 | A1 | 3/2018 | Ohhira et al. | |

FOREIGN PATENT DOCUMENTS

| | | |
|---|---|---|
| CN | 104079664 A | 10/2014 |
| CN | 105869440 A | 8/2016 |
| JP | 2013081248 A | 5/2013 |
| JP | 2013191979 A | 9/2013 |
| JP | 2014179884 A | 9/2014 |
| JP | 2015109572 A | 6/2015 |

OTHER PUBLICATIONS

International Search Report in PCT/CN2017/083747 dated Sep. 6, 2017, 4 pages.
Written Opinion of the International Searching Authority in PCT/CN2017/083747 dated Sep. 6, 2017, 4 pages.
Examination Report in Japanese Application No. 2018-504133 dated May 28, 2019, 12 pages.

* cited by examiner

SYSTEMS AND METHODS FOR ASSISTING TWO TERMINALS TO ESTABLISH CONNECTIONS THEREBETWEEN

CROSS-REFERENCE TO RELATED APPLICATIONS

This application is a continuation of International Application No. PCT/CN2017/083747, filed on May 10, 2017, which claims priority to Chinese Application No. 201611113978.4 filed on Dec. 6, 2016, the contents of which are incorporated herein by reference in its entirety.

TECHNICAL FIELD

The present disclosure generally relates to systems and methods for on-demand services, and in particular, systems and methods for assisting two terminals to establish connections therebetween.

BACKGROUND

On-demand transportation services utilizing Internet technology, such as online taxi-hailing services, have become increasingly popular because of their convenience. While traveling towards his/her destination in a taxi, a passenger may wish to listen to music or watch videos on his/her smartphone. However, a phone call or a message may interrupt the music playing or video playing, and the passenger may have to hold the smartphone for long time if the time of the videos are long. Therefore, sometimes it is inconvenient for the requestor to listen to the music or watch the videos on the smartphone in the taxi. In addition, the above situation may also increase power consumption and reduce use of time of the requestor terminal. Therefore, it is desirable to provide systems and methods for assisting the requestor terminal to establish connections with another terminal that can play multimedia in the requestor terminal.

SUMMARY

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

According to a first aspect of the present disclosure, a system of electronic device may include one or more storage media and one or more processors configured to communicate with the one or more storage media. The one or more storage media may include a set of instructions for assisting two other terminals to establish connections therebetween. When the one or more processors executing the set of instructions, the one or more processors may be directed to perform one or more of the following operations. The one or more processors may receive first electronic signals from a second terminal, the first electronic signals including first structured data encoding terminal information of a first terminal associated with the second terminal. The one or more processors may receive second electronic signals including second structured data encoding an identification of a third terminal. The one or more processors may send third electronic signals to the third terminal, the third electronic signals including third structured data encoding the terminal information of the first terminal.

In some embodiments, the first terminal may be associated with a vehicle, the second terminal may be associated with a transportation service provider, and the third terminal may be associated with a transportation service requestor.

In some embodiments, the one or more processors may determine that the service provider is providing a transportation service to the service requestor.

In some embodiments, the first structured data may include a first portion encoding an identification of the first terminal, and a second portion encoding connection information of the first terminal.

In some embodiments, the third structured data may include a first portion encoding an identification of the third terminal, and a second portion encoding the terminal information.

In some embodiments, the connection information may include an authorization code to enable the first terminal to accept a connection request from the third terminal.

In some embodiments, the third structured data may include a third portion encoding a command to direct the third terminal to initiate a process to establish a communication connection with the first terminal based on the terminal information of the first terminal.

In some embodiments, the communication connection between the third terminal and the first terminal may be limited to unidirectional sending multimedia data from the third terminal to the first terminal.

In some embodiments, the first terminal may be included in the second terminal.

According to a second aspect of the present disclosure, a method may include one or more of the following operations. One or more processors of an online on-demand transportation service platform may receive first electronic signals from a second terminal, the first electronic signals including first structured data encoding terminal information of a first terminal associated with the second terminal. The one or more processors may receive second electronic signals including second structured data encoding an identification of a third terminal. The one or more processors may send third electronic signals to the third terminal, the third electronic signals including third structured data encoding the terminal information of the first terminal.

According to a third aspect of the present disclosure, a non-transitory computer readable medium may comprise at least one set of instructions for assisting two other terminals to establish connections therebetween. The at least one set of instructions may be executed by one or more processors of a computer server. The one or more processors may receive first electronic signals from a second terminal, the first electronic signals including first structured data encoding terminal information of a first terminal associated with the second terminal. The one or more processors may receive second electronic signals including second structured data encoding an identification of a third terminal. The one or more processors may send third electronic signals to the third terminal, the third electronic signals including third structured data encoding the terminal information of the first terminal.

In some embodiments, the first terminal may be associated with a vehicle, the second terminal may be associated with a transportation service provider, and the third terminal may be associated with a transportation service requestor.

In some embodiments, the one or more processors may determine that the service provider is providing a transportation service to the service requestor.

In some embodiments, the first structured data may include a first portion encoding an identification of the first terminal, and a second portion encoding connection information of the first terminal.

In some embodiments, the third structured data may include a first portion encoding an identification of the third terminal, and a second portion encoding the terminal information.

In some embodiments, the connection information may include an authorization code to enable the first terminal to accept a connection request from the third terminal.

In some embodiments, the third structured data may include a third portion encoding a command to direct the third terminal to initiate a process to establish a communication connection with the first terminal based on the terminal information of the first terminal.

In some embodiments, the communication connection between the third terminal and the first terminal may be limited to unidirectional sending multimedia data from the third terminal to the first terminal.

In some embodiments, the first terminal may be included in the second terminal.

According to a fourth aspect of the present disclosure, a system of electronic device may include one or more storage media and one or more processors configured to communicate with the one or more storage media. The one or more storage media may include a set of instructions for connecting to another terminal device associated with an on-demand transportation platform. When the one or more processors executing the set of instructions, the one or more processors may be directed to perform one or more of the following operations. The one or more processors may receive first electronic signals from a computer server, the first electronic signals including first structured data encoding terminal information associated with a target terminal. The one or more processors may generate second electronic signals to initiate a communication connection between the target terminal and the electronic terminal based on the terminal information of the target terminal.

In some embodiments, the computer server may be associated with an online on-demand transportation service platform, and the target terminal may be associated with a terminal of a transportation service provider who is providing a transportation service to a user of the electronic terminal.

In some embodiments, the first structured data may include a first portion encoding an identification of the target terminal, and a second portion encoding connection information of the target terminal.

In some embodiments, the connection information may include an authorization code to enable the target terminal to accept a connection request from the electronic terminal.

In some embodiments, the one or more processors may access the one or more storage media to read multimedia contents stored therein. The one or more processors may encode the multimedia contents to second structured data. The one or more processors may send third electronic signals encoding the second structured data to the target terminal via the communication connection.

In some embodiments, the communication connection between the electronic terminal and the target terminal may be limited to unidirectional sending multimedia data from the electronic terminal to the target terminal.

In some embodiments, the one or more processors may send, to the target terminal, fourth electronic signals encoding a request of connecting the target terminal with the electronic terminal based on the terminal information of the target terminal. The one or more processors may receive, from the target terminal, fifth electronic signals encoding a response of agreeing to connect the target terminal with the electronic terminal. The one or more processors may establish the communication connection between the target terminal and the electronic terminal based on the response.

According to a fifth aspect of the present disclosure, a method may include one or more of the following operations. One or more processors of an electronic device may receive first electronic signals from a computer server, the first electronic signals including first structured data encoding terminal information associated with a target terminal. The one or more processors may generate second electronic signals to initiate a communication connection between the target terminal and the electronic terminal based on the terminal information of the target terminal.

According to a sixth aspect of the present disclosure, a non-transitory computer readable medium may comprise at least one set of instructions for connecting to another terminal device associated with an on-demand transportation platform. The at least one set of instructions may be executed by one or more processors of an electronic device. The one or more processors may receive first electronic signals from a computer server, the first electronic signals including first structured data encoding terminal information associated with a target terminal. The one or more processors may generate second electronic signals to initiate a communication connection between the target terminal and the electronic terminal based on the terminal information of the target terminal.

In some embodiments, the computer server may be associated with an online on-demand transportation service platform, and the target terminal may be associated with a terminal of a transportation service provider who is providing a transportation service to a user of the electronic terminal.

In some embodiments, the first structured data may include a first portion encoding an identification of the target terminal, and a second portion encoding connection information of the target terminal.

In some embodiments, the connection information may include an authorization code to enable the target terminal to accept a connection request from the electronic terminal.

In some embodiments, the one or more processors may access the one or more storage media to read multimedia contents stored therein. The one or more processors may encode the multimedia contents to second structured data. The one or more processors may send third electronic signals encoding the second structured data to the target terminal via the communication connection.

In some embodiments, the communication connection between the electronic terminal and the target terminal may be limited to unidirectional sending multimedia data from the electronic terminal to the target terminal.

In some embodiments, the one or more processors may send, to the target terminal, fourth electronic signals encoding a request of connecting the target terminal with the electronic terminal based on the terminal information of the target terminal. The one or more processors may receive, from the target terminal, fifth electronic signals encoding a response of agreeing to connect the target terminal with the electronic terminal. The one or more processors may establish the communication connection between the target terminal and the electronic terminal based on the response.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily regarding assiting two terminals to establish connections there between, it should also be understood that this is only one exemplary embodiment. The system or method of the present disclosure may be applied to any other kind of on demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may include a web page, a plug-in of a browser, a client terminal, a custom system, an internal analysis system, an artificial intelligence robot, or the like, or any combination thereof.

The term "passenger," "requestor," "service requestor," and "customer" in the present disclosure are used interchangeably to refer to an individual, an entity or a tool that may request or order a service. Also, the term "driver," "provider," "service provider," and "supplier" in the present disclosure are used interchangeably to refer to an individual, an entity or a tool that may provide a service or facilitate the providing of the service. The term "user" in the present disclosure may refer to an individual, an entity or a tool that may request a service, order a service, provide a service, or facilitate the providing of the service. For example, the user may be a passenger, a driver, an operator, or the like, or any combination thereof. In the present disclosure, "passenger" and "passenger terminal" may be used interchangeably, and "driver" and "driver terminal" may be used interchangeably.

The term "service request" and "order" in the present disclosure are used interchangeably to refer to a request that may be initiated by a passenger, a requestor, a service requestor, a customer, a driver, a provider, a service provider, a supplier, or the like, or any combination thereof. The service request may be accepted by any one of a passenger, a requestor, a service requestor, a customer, a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to online systems and methods for assisting a smartphone (i.e., a requestor terminal) of a passenger (i.e., a service requestor) to establish connections with a display (i.e., a multimedia player) in a vehicle (e.g., a taxi) of a service provider. To this end, when the passenger gets into the vehicle, the passenger's smartphone or the driver's smartphone may notify a server of an online on-demand transportation service platform that the passenger is on board, and then the server may send to the smartphone information necessary to connect to the display in the vehicle, such as Bluetooth™ ID and password of that display. With the ID and password, when the passenger watches a video, the smartphone may automatically connect to the display and send the video data to the display. As a result, the passenger may enjoy the video without using his/her smart phone.

The technical solution of this disclosure relates to online communication. Particularly, the technical solution relates to wirelessly sending a third-party's wireless connection information from a server of an online on-demand transportation platform. The technology and solution rooted only in post-Internet era. In general, a passenger may listen to music or watch videos on his/her smartphone when the passenger in a vehicle (e.g., a taxi). If the passenger wants to connect with a display (e.g., a multimedia player or a smartphone of a driver) in the vehicle and listen to music or watch videos in the display, the passenger may ask the driver for the authorization code and/or the identification of the display. The online on-demand service system, however, may obtain the authorization code and/or the identification of the display and send the authorization code and/or the identification to the smartphone of the passenger. The smartphone of the passenger can connect with the display automatically based on the received authorization code and/or identification. Therefore, through the Internet, the online on-demand transportation systems may provide a much more convenient transaction platform to assist the smartphone of the passenger to connect with the display in the vehicle automatically.

Figure 1:
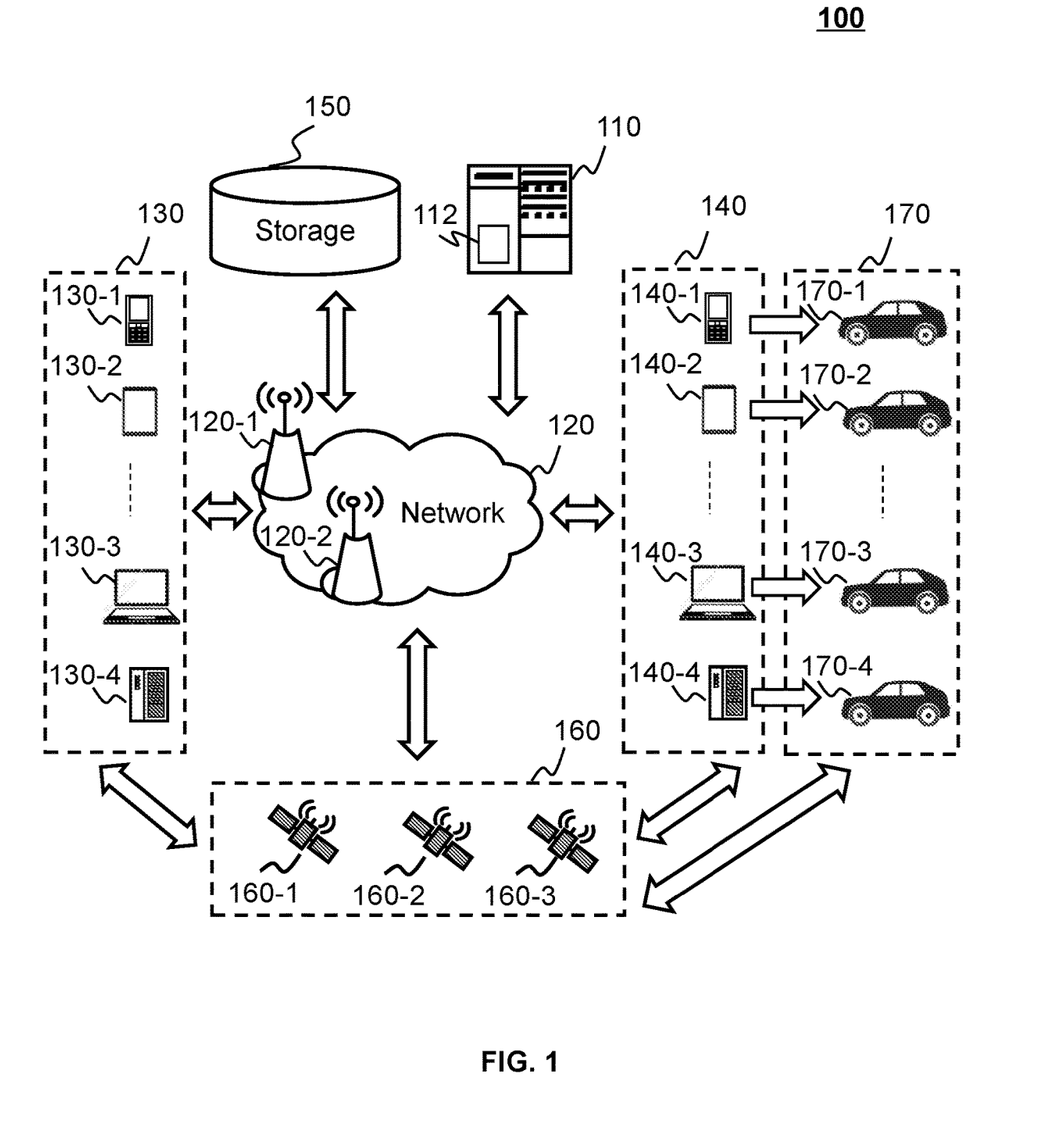
FIG. 1 is a schematic diagram of an exemplary on-demand service system according to some embodiments of the present disclosure.

FIG. 1 is a schematic diagram of an exemplary on-demand service system 100 according to some embodiments. For example, the on-demand service system 100 may be an online on-demand transportation service system for transportation services such as taxi hailing, chauffeur services, delivery vehicles, carpool, bus service, driver hiring and shuttle services. The on-demand service system 100 may include a server 110, a network 120, a requestor terminal 130, a provider terminal 140, a storage 150, a positioning system 160, and a vehicle terminal 170. The server 110 may include a processing engine 112.

In some embodiments, the server 110 may be a single server or a server group. The server group may be centralized, or distributed (e.g., server 110 may be a distributed system). In some embodiments, the server 110 may be local or remote. For example, the server 110 may access information and/or data stored in the requestor terminal 130, the provider terminal 140, and/or the storage 150 via the network 120. As another example, the server 110 may be directly connected to the requestor terminal 130, the provider terminal 140, and/or the storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service request to perform one or more functions described in the present disclosure. For example, the processing engine 112 may determine a reference parameter and an actual parameter associated with the service request obtained from the requestor terminal 130. In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components in the on-demand service system 100 (e.g., the server 110, the requestor terminal 130, the provider terminal 140, the storage 150, the positioning system 160, and the vehicle terminal 170) may send information and/or data to other component(s) in the on-demand service system 100 via the network 120. For example, the server 110 may obtain/acquire service request from the requestor terminal 130 via the network 120. In some embodiments, the network 120 may be any type of wired or wireless network, or a combination thereof. Merely by way of example, the network 130 may include a cable network, a wireline network, an optical fiber network, a telecommunications network, an intranet, the Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

In some embodiments, a requestor may be a user of the requestor terminal 130. In some embodiments, the user of the requestor terminal 130 may be someone other than the requestor. For example, a user A of the requestor terminal 130 may use the requestor terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may user the provider terminal 140 to receive a service request for a user D, and/or information or instructions from the server 110. In some embodiments, "requestor" and "requestor terminal" may be used interchangeably, and "provider" and "provider terminal" may be used interchangeably.

In some embodiments, the requestor terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, glasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a desktop, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google Glass™, a RiftCon™, a Fragments™, a Gear VR™, etc. In some embodiments, a built-in device in the motor vehicle 130-4 may include an onboard computer, an onboard television, etc. In some embodiments, the requestor terminal 130 may be a device with positioning technology for locating the position of the requestor and/or the requestor terminal 130.

In some embodiments, the provider terminal 140 may be a device that is similar to, or the same as the requestor terminal 130. In some embodiments, the provider terminal 140 may be a device utilizing positioning technology for locating the position of a user of the provider terminal 140 (e.g., a service provider) and/or the provider terminal 140. In some embodiments, the requestor terminal 130 and/or the provider terminal 140 may communicate with one or more other positioning devices to determine the position of the requestor, the requestor terminal 130, the provider, and/or the provider terminal 140. In some embodiments, the requestor terminal 130 and/or the provider terminal 140 may send positioning information to the server 110.

The storage 150 may store data and/or instructions. In some embodiments, the storage 150 may store data obtained from the requestor terminal 130 and/or the provider terminal 140. In some embodiments, the storage 150 may store data and/or instructions that the server 110 may execute or use to perform exemplary methods described in the present disclosure. In some embodiments, storage 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components in the on-demand service system 100 (e.g., the server 110, the requestor terminal 130, the provider terminal 140, etc.). One or more components in the on-demand service system 100 may access the data or instructions stored in the storage 150 via the network 120. In some embodiments, the storage 150 may be directly connected to or communicate with one or more components in the on-demand service system 100 (e.g., the server 110, the requestor terminal 130, the provider terminal 140, etc.). In some embodiments, the storage 150 may be part of the server 110.

The positioning system 160 may determine information associated with an object, for example, one or more of the requestor terminal 130, the provider terminal 140, etc. For example, the positioning system 160 may determine a current location of the requestor terminal 130. In some embodiments, the positioning system 160 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information may include a location, an elevation, a velocity, or an acceleration of the object, or a current time. The location may be in the form of coordinates, such as, latitude coordinate and longitude coordinate, etc. The positioning system 160 may include one or more satellites, for example, a satellite 160-1, a satellite 160-2, and a satellite 160-3. The satellites 160-1 through 160-3 may determine the information mentioned above independently or jointly. The satellite positioning system 160 may send the information mentioned above to the network 120, the requestor terminal 130, or the provider terminal 140 via wireless connections.

The vehicle terminal 170 may refer to a terminal associated with a vehicle. The vehicle terminal 170 may include a built-in device in a vehicle. The vehicle terminal 170 may include an MP3 player, an MP4 player, a television, a tablet computer, a laptop, a desktop computer, a mobile phone, or the like, or any combination thereof. In some embodiments, the vehicle terminal 170 may be included in the provider terminal 140.

In some embodiments, one or more components in the on-demand service system 100 (e.g., the server 110, the requestor terminal 130, the provider terminal 140, etc.) may have permission to access the storage 150. In some embodiments, one or more components in the on-demand service system 100 may read and/or modify information relating to the requestor, provider, and/or the public when one or more conditions are met. For example, the server 110 may read and/or modify one or more users' information after finishing a service. As another example, the provider terminal 140 may access information relating to the requestor when receiving a service request from the requestor terminal 130, but the provider terminal 140 may not modify the relevant information of the requestor.

In some embodiments, information exchanging of one or more components in the on-demand service system 100 may be achieved by way of requesting a service. The object of the service request may be any product. In some embodiments, the product may be a tangible product or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof.

The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

Figure 2:
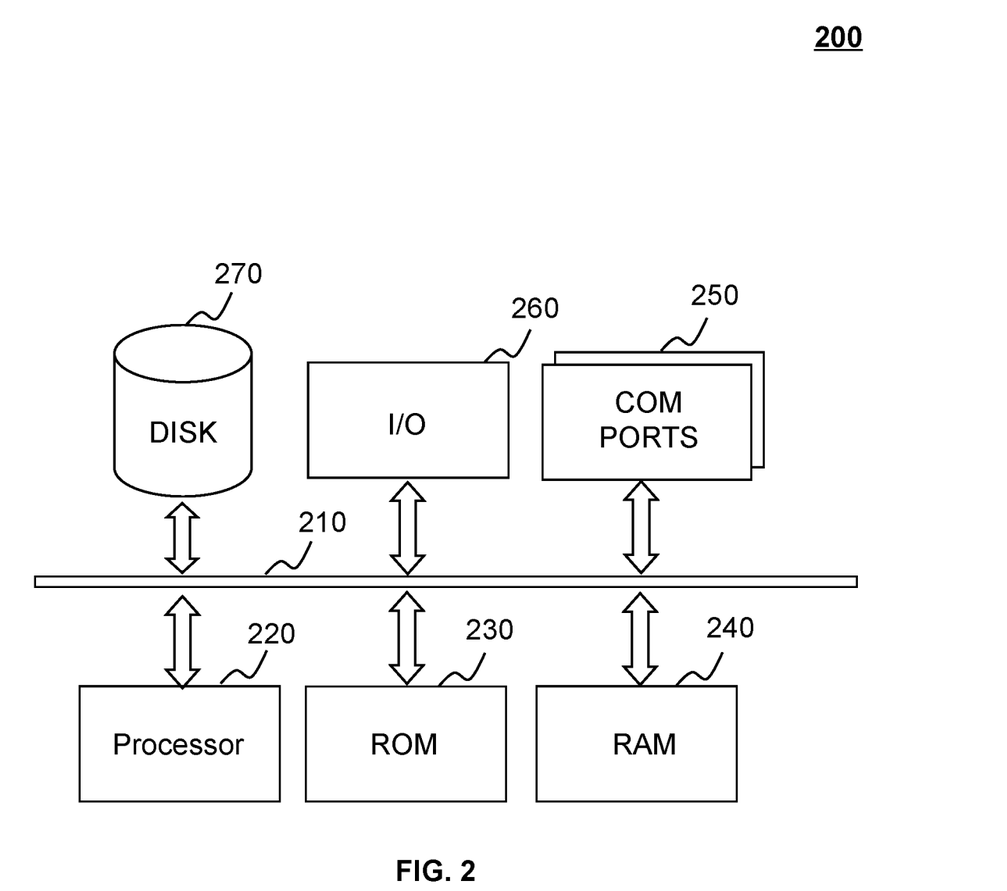
FIG. 2 is a schematic diagram illustrating an exemplary computing device according to some embodiments of the present disclosure.

FIG. 2 is a schematic diagram illustrating exemplary hardware and software components of a computing device 200 on which the server 110, the requestor terminal 130, the vehicle terminal 170, and/or the provider terminal 140 may be implemented according to some embodiments of the present disclosure. For example, the processing engine 112 may be implemented on the computing device 200 and configured to perform functions of the processing engine 112 disclosed in this disclosure.

The computing device 200 may be a general-purpose computer or a special-purpose computer; both may be used to implement an on-demand system for the present disclosure. The computing device 200 may be used to implement any component of the on-demand service as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor 220, in the form of one or more processors, for executing program instructions. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, RAM 240, and/or any other type of non-transitory storage medium to be executed by the processor 220. The methods and/or processes of the present disclosure may be implemented as the program instructions. The computing device 200 also includes an I/O component 260, supporting input/output between the computer and other components therein. The computing device 200 may also receive programming and data via network communications.

Merely for illustration, only one processor is illustrated in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
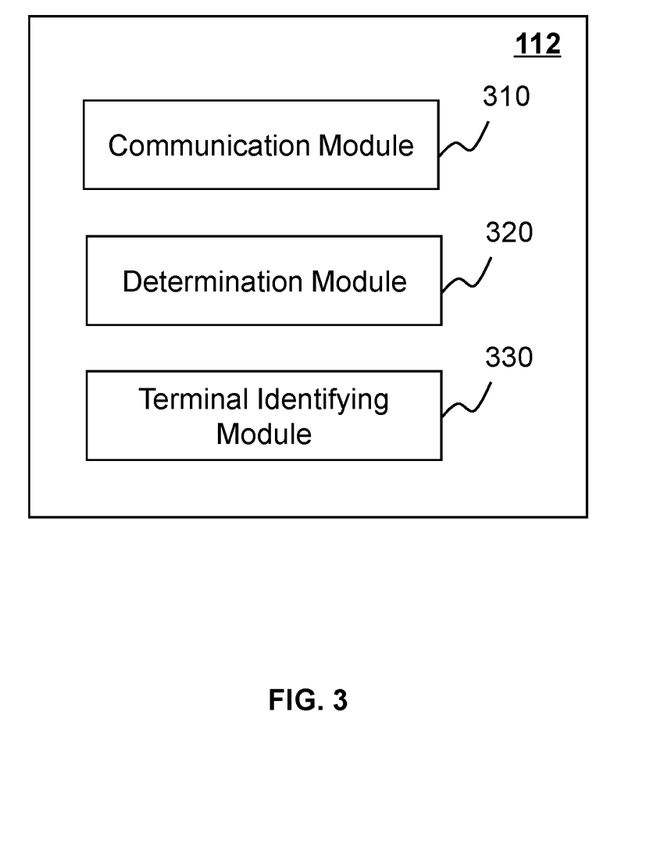
FIG. 3 is a schematic block diagram illustrating an exemplary processing engine according to some embodiments of the present disclosure.

FIG. 3 is a schematic block diagram illustrating an exemplary processing engine 112 according to some embodiments of the present disclosure. The processing engine 112 may include a communication module 310, a determination module 320, and a terminal identifying module 330.

The communication module 310 may be configured to receive and/or send information related to a first terminal associated with a vehicle (e.g., a vehicle terminal 170 of FIG. 1), a second terminal associated with a service provider (e.g., a provider terminal 140 of FIG. 1) or a third terminal associated with a service requestor (e.g., a requestor terminal 130 of FIG. 1). In some embodiments, the second terminal may include the first terminal.

In some embodiments, the third terminal (e.g., the service requestor terminal 130) may communicate with the processing engine 112 via an application installed in the third terminal. The service requestor may send a request for transportation service to the processing engine 112 through the application. In some embodiments, the transportation service may be a service of taking a subject from one location to another location using a vehicle. The subject may include passengers and/or goods. For example, the transportation service may be a taxi service or a delivery service. The vehicle of the transportation systems may include a taxi, a private car, a hitch, a bus, a bike, an electric bicycle, a tricycle, a motorcycle, a train, a bullet train, a high speed train, a subway, a vessel, an aircraft, a spaceship, a hot-air balloon, a driverless vehicle, or the like, or any combination thereof.

In some embodiments, the service provider may be someone that accepts the request for transportation service from the service requestor and provides the transportation service to the service requestor using the vehicle. For example, the service provider may be a taxi driver and the service requester may be a passenger requesting a taxi hailing service. The second terminal (e.g., the service provider terminal 140) may communicate with the processing engine 112 via an application installed in the second terminal. The service provider may receive the request for transportation service from the processing engine 112 and accept the request for transportation service through the application.

In some embodiments, the communication module 310 may receive terminal information of the first terminal from the second terminal. In some embodiments, the communication module 310 may send the terminal information of the first terminal to the third terminal. In some embodiments, the communication module 310 may send a notification to the third terminal to remind the service requestor to establish a connection between the first terminal and the third terminal. In some embodiments, the connection between the first terminal and the third terminal may include a cable network, a wireline network, an optical fiber network, a telecommunications network, an intranet, the Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee network, a near field communication (NFC) network, an infrared connection, or the like, or any combination thereof. In some embodiments, the terminal information may include an identification of the first terminal, a connection information, or the like, or any combination thereof. The connection information may include an authorization code to enable the first terminal to establish a connection with the third terminal.

The determination module 320 may be configured to determine when to send the terminal information of the first terminal to the third terminal. For example, the determination module 320 may determine that the service provider is providing the transportation service to the service requestor. The communication module 310 may send the terminal information of the first terminal to the third terminal in response to the determination.

The terminal identifying module 330 may be configured to identify the third terminal. In some embodiments, the determination result may include an identification of the third terminal. The terminal identifying module 330 may identify the third terminal based on the identification of the third terminal.

In some embodiments, the information related to the first terminal, the second terminal or the third terminal may be transmitted and/or received using any suitable communication protocol (e.g., the Hypertext Transfer Protocol (HTTP), Address Resolution Protocol (ARP), Dynamic Host Configuration Protocol (DHCP), File Transfer Protocol (FTP), etc.).

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth™, a ZigBee, a Near Field Communication (NFC), an infrared connection, or the like, or any combination thereof. Two or more of the modules may be combined as a single module, and any one of the modules may be divided into two or more units. For example, the terminal identifying module 330 may be integrated into the determination module 320 as a single module which may both determine when to send the terminal information associated with the first terminal to the third terminal and identify the third the third terminal. As another example, the processing engine 112 may include a storage module (not shown in FIG. 3) which may be configured to store data and/or instructions associated with the modules in the processing engine 112.

One of ordinary skill in the art would understand that when an element of the on-demand service system 100 performs, the element may perform through electrical signals (e.g., current) and/or electromagnetic signals. For example, when a requestor terminal 130 sends out a service request to the server 110, a processor of the requestor terminal 130 may generate an electrical signal encoding the request. The processor of the requestor terminal 130 may then send the electrical signal to an output port. If the requestor terminal 130 communicates with the server 110 via a wired network, the output port may be physically connected to a cable, which further transmit the electrical signal to an input port of the server 110. If the service terminal 130 communicates with the server 110 via a wireless network, the output port of the requestor terminal 130 may be one or more antennas, which convert the electrical signal to electromagnetic signal. Similarly, a provider terminal 140 may receive an instruction and/or service request from the server 110 via electrical signal or electromagnet signals. Within an electronic device, such as the requestor terminal 130, the provider terminal 140, and/or the server 110, when a processor thereof processes an instruction, sends out an instruction, and/or performs an action, the instruction and/or action is conducted via electrical signals. For example, when the processor retrieves or saves data from a storage medium, it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 4:
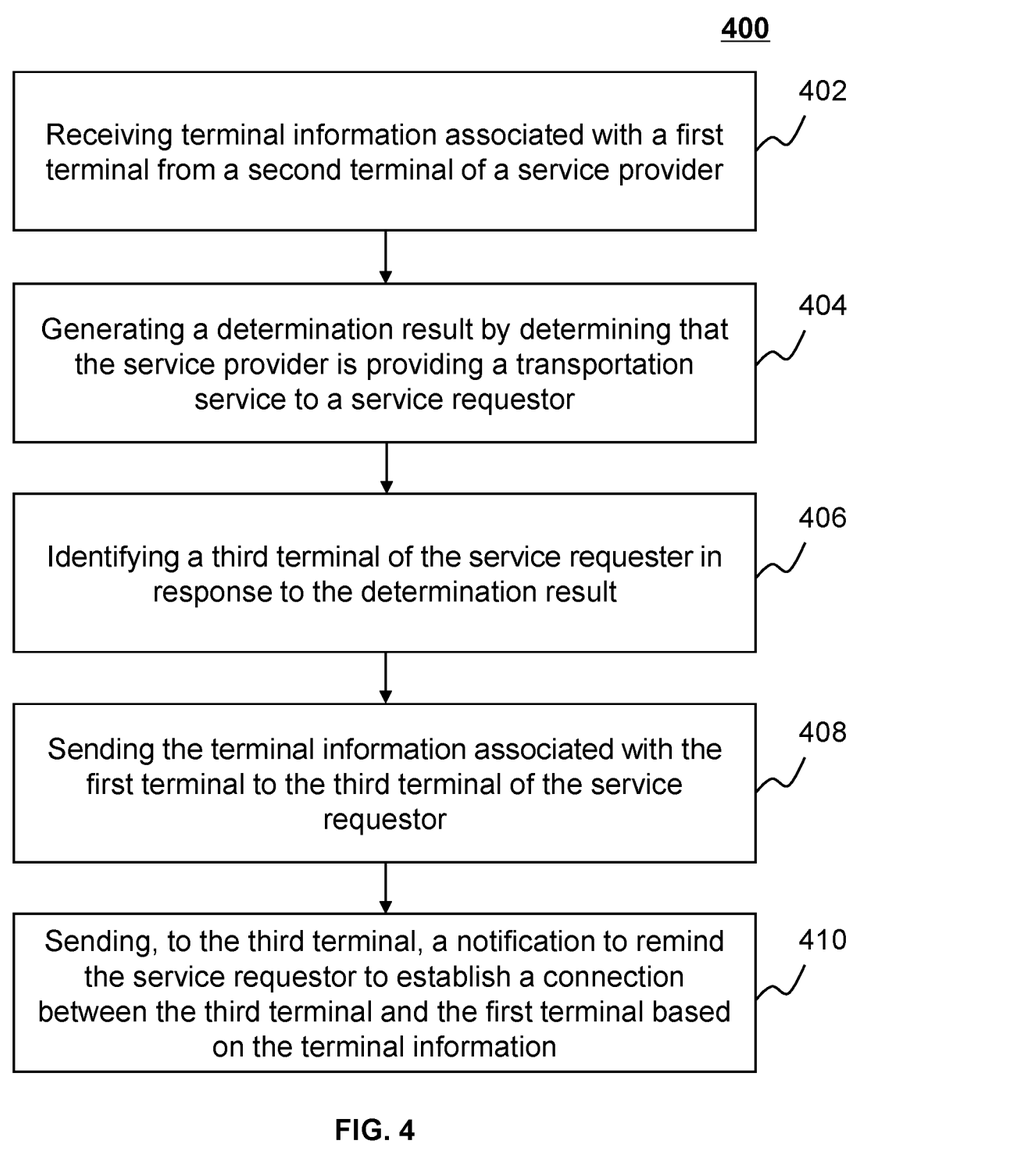
FIG. 4 is a flowchart illustrating an exemplary process for assisting two terminals to establish connections therebetween according to some embodiments of the present disclosure.

FIG. 4 is a flowchart illustrating an exemplary process/method 400 for assisting two terminals to establish connections therebetween according to some embodiments of the present disclosure. The process and/or method 400 may be executed by the processing engine 112 in the server 110. For example, the process and/or method 400 may be implemented as a set of instructions (e.g., an application) stored in the storage ROM 230 or RAM 240. The processor 220 may execute the set of instructions and may accordingly be directed to perform the process and/or method 400. The operations of the illustrated process/method presented below are intended to be illustrative. In some embodiments, the process/method 400 may be accomplished with one or more additional operations not described, and/or without one or more of the operations discussed. Additionally, the order in which the operations of the process/method as illustrated in FIG. 4 and described below is not intended to be limiting.

In step 402, the communication module 310 may receive terminal information associated with a first terminal from a second terminal.

For example, the first terminal may be a display device installed in a vehicle, and second terminal may be a driver's terminal such as a taxi driver's smartphone. During work hours, the driver's terminal may send to the server of an online transportation service platform wireless connection ID and password of the vehicle display device.

Accordingly, in some embodiments, the terminal information may include an identification of the vehicle display device, a connection information, or the like, or any combination thereof. The connection information may include an authorization code to enable the vehicle display device to establish a connection with the passenger's terminal.

In some embodiments, the driver's terminal may obtain the terminal information of the vehicle display device and send the terminal information of the vehicle display device to the processing engine 112. For example, the driver's terminal may establish a connection (e.g., a Bluetooth™, a Wireless Local Area Network (WLAN) or an infrared connection) with the vehicle display device. The driver's terminal may obtain the terminal information of the vehicle display device via the connection and send the terminal information of the vehicle display device to the processing engine 112 via the network 120.

In some embodiments, the communication module 310 may receive vehicle signals from the driver's terminal. The vehicle signals include vehicle structured data encoding the terminal information associated with the vehicle display device. In some embodiments, the vehicle structured data may include a first portion encoding the identification of the vehicle display device and a second portion encoding the connection information of the vehicle display device. In some embodiments, the vehicle signals may be wireless signals.

In step 404, the determination module 320 may generate a determination result by determining that the service provider is providing a transportation service to a service requestor.

In some embodiments, the driver's terminal (e.g., the second terminal or the service provider terminal 140) may communicate with the processing engine 112 via an application installed in the driver's terminal. In some embodiments, the application installed in the driver's terminal may provide an interface for the driver to send commands and/or instructions to the driver's terminal and/or the processing engine 112. For example, the driver may use the interface to send a first instruction that the driver accepts the request for transportation service from the passenger to the processing engine 112. As another example, the driver may use the interface to send a second instruction that the driver has picked up the passenger to the processing engine 112. As still another example, the driver may use the interface to send a third instruction that the driver starts to charge the passenger to the processing engine 112. Still another example, the application may be installed in the passenger's terminal, so that the passenger may use the interface to notify the processing engine 112 about his/her status about the service, as stated above, with the driver. The determination module 320 may generate a determination result that the driver is providing a transportation service to a driver when receiving at least one of the first instruction, the second instruction or the third instruction from the driver's terminal and/or the passenger's terminal.

In some embodiments, the driver's terminal and/or the passenger's terminal may send, to the determination module 320, service signals including a first portion encoding at least one of the first instruction, the second instruction or the third instruction, a second portion encoding a command to direct the determination module 320 to generate a determination result that the driver is providing a transportation service to the service requestor, a third portion encoding an identification of the driver's terminal, and a fourth portion encoding an identification of the passenger's terminal.

In some embodiments, the determination module 320 may generate, based on the service signals from the driver's terminal and/or the passenger's terminal, determination signals including a first portion encoding the determination result that the driver is providing a transportation service to the service requestor, a second portion encoding a command to direct the terminal identification module 330 to identify the passenger's terminal, and a third portion encoding the identification of the passenger's terminal. The determination module 320 may send the determination signals to the terminal identification module 330.

In step 406, the terminal identification module 330 may identify a third terminal in response to the determination result.

In some embodiments, the determination result may include the identification of the passenger's terminal. The terminal identifying module 330 may identify the passenger's terminal based on the identification of the passenger's terminal.

In some embodiments, the terminal identification module 330 may receive the determination signals from the determination module 320, and generate and/or confirm identification signals including a first portion encoding the identification of the passenger's terminal based on the second portion and the third portion included in the determination signals. The identification signals may further include a second portion encoding a command to direct the communication module 310 to send the terminal information of the vehicle display device to the passenger's terminal. The terminal identification module 330 may send the identification signals to the communication module 310. In some embodiments, the identification signals may be wireless signals.

In step 408, the communication module 310 may send the terminal information associated with the vehicle display device to the passenger's terminal. The communication module 310 may send the information associated with the vehicle display device as a cellphone message, an e-mail, an instant communication message from a social network service, or the like, or any combination thereof.

In some embodiments, the communication module 310 may send connection signals to the passenger's terminal. The connection signals may include connection structured data including a first portion encoding the identification of the passenger's terminal, a second portion encoding the terminal information of the vehicle display device, and a third portion encoding a command to direct the passenger's terminal to initiate a process to establish a connection with the vehicle display device based on the terminal information of the vehicle display device. In some embodiments, the connection signals may be wireless signals.

In some embodiments, the passenger's terminal may initiate the process of establishing the connection with the vehicle display device automatically while the passenger's terminal receives the terminal information of the vehicle display device. In some embodiments, when receiving the terminal information of the vehicle display device from the processing engine 112, the passenger's terminal may initiate the process of establishing the connection with the vehicle display device based on a notification to remind the service requestor to establish a connection between the vehicle display device and the passenger's terminal from the processing engine 112.

In step 410, the communication module 310 may send, to the third terminal, a notification to remind the service requestor to establish a connection between the first terminal and the third terminal based on the terminal information. The notification may include a cellphone message, an e-mail, a pop-up message from a social network service, or the like, or any combination thereof.

In some embodiments, the communication module 310 may perform step 410 after step 408. In some embodiments, the communication module 310 may perform step 410 and step 408 simultaneously.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process/method 400. As another example, for the condition that the process of establishing the connection between the vehicle display device and the passenger's terminal was initiated automatically in the passenger's terminal, step 410 may be optional.

Figure 5A:
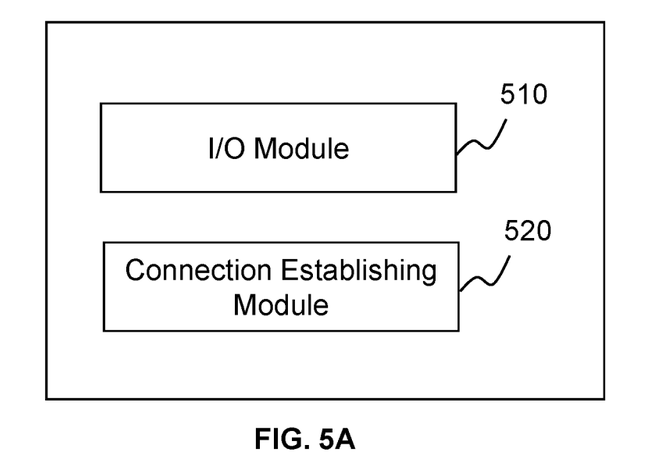
FIG. 5A is a schematic block diagram illustrating an exemplary third terminal associated with a service requestor according to some embodiments of the present disclosure.

FIG. 5A is a schematic block diagram illustrating an exemplary third terminal according to some embodiments of the present disclosure. In some embodiments, the third terminal may be a requestor terminal 130 of FIG. 1. The following description in FIG. 5A will take a passenger terminal as an example of the third terminal. The third terminal may include an I/O module 510 and a connection establishing module 520.

The I/O module 510 may be configured to receive and/or send information related to the vehicle display device, the driver's terminal or the passenger's terminal. For example, the I/O module 510 may receive terminal information of a vehicle display device (e.g., the vehicle terminal 170) from a computer server of an online on-demand transportation service platform (e.g., the processing engine 112 in the server 110). As another example, the I/O module 510 may send, to the vehicle display device, a request of connecting the vehicle display device with the passenger's terminal (e.g., the requestor terminal 130) based on the terminal information of the vehicle display device. As still another example, the I/O module 510 may receive, from the vehicle display device, a response of agreeing to connect the vehicle display device with the passenger's terminal. As a further example, the I/O module 510 may send multimedia contents in the passenger's terminal to the vehicle display device.

The connection establishing module 520 may be configured to initiate a process of establishing a connection between the vehicle display device and the passenger's terminal based on the terminal information of the vehicle display device. In some embodiments, the connection establishing module 520 may initiate the process of establishing the connection with the vehicle display device automatically while the I/O module 510 receives the terminal information of the vehicle display device. In some embodiments, when the I/O module 510 receives the terminal information of the vehicle display device from the processing engine 112, the connection establishing module 520 may initiate the process of establishing the connection with the vehicle display device by receiving a command to initiate the process of establishing the connection with the vehicle display device input by a user (e.g., the service requestor).

The modules in the requestor terminal 130 (e.g., the passenger's terminal) may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth™, a ZigBee, a Near Field Communication (NFC), or the like, or any combination thereof. Two or more of the modules may be combined as a single module, and any one of the modules may be divided into two or more units. In some embodiments, the requestor terminal 130 may include a storage module (not shown in FIG. 5A) which may be configured to store data and/or instructions associated with the modules in the requestor terminal 130.

Figure 5B:
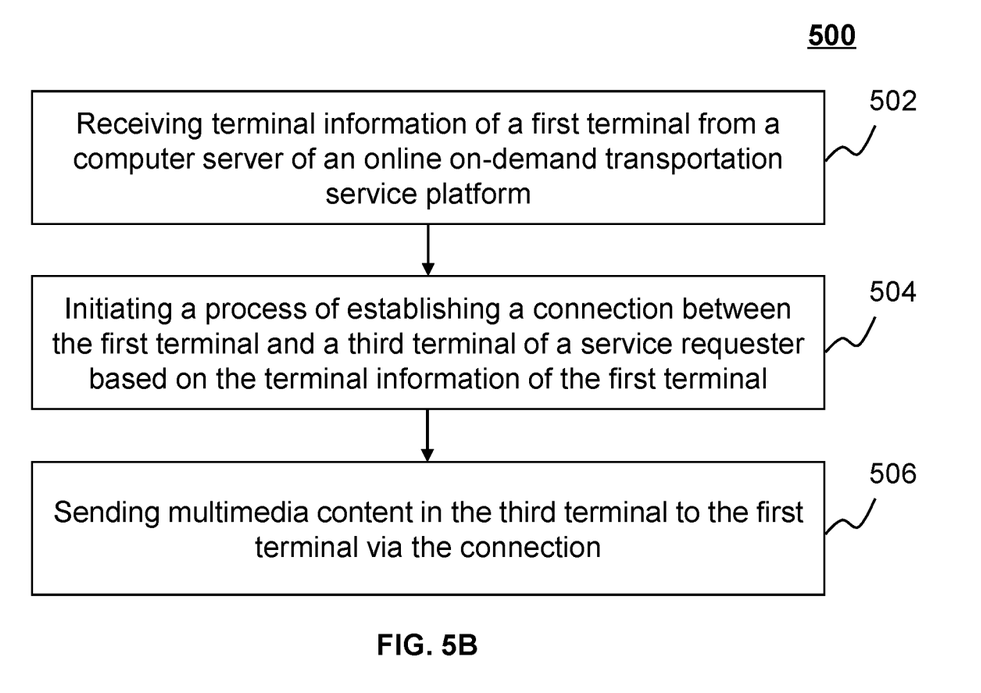
FIG. 5B is a flowchart illustrating an exemplary process for establishing a connection between two terminals according to some embodiments of the present disclosure.

FIG. 5B is a flowchart illustrating an exemplary process/method 500 for establishing a connection between two terminals according to some embodiments of the present disclosure. The process and/or method 500 may be executed by the requestor terminal 130 (e.g., the passenger's terminal) in the server 110. For example, the requestor terminal 130 may be implemented on the computing device 200 in FIG. 2. The process and/or method 500 may be implemented as a set of instructions (e.g., an application) stored in the storage ROM 230 or RAM 240. The processor 220 may execute the set of instructions and may accordingly be directed to perform the process and/or method 500. The operations of the illustrated process/method presented below are intended to be illustrative. In some embodiments, the process/method may be accomplished with one or more additional operations not described, and/or without one or more of the operations discussed. Additionally, the order in which the operations of the process/method as illustrated in FIG. 5B and described below is not intended to be limiting.

In step 502, the I/O module 510 may receive terminal information of a vehicle display device from a computer server of an online on-demand transportation service platform (e.g., the processing engine 112 in the server 110).

In some embodiments, the I/O module 510 may receive the connection signals from the computer server (e.g., the processing engine 112 in the server 110). The connection signals may include connection structured data encoding the terminal information associated with the vehicle display device. The connection structured data may include a first portion encoding the identification of the passenger's terminal, a second portion encoding the terminal information of the vehicle display device, and a third portion encoding a command to direct the passenger's terminal to initiate a process of establishing a connection with the vehicle display device.

In step 504, the connection establishing module 520 may initiate a process of establishing a connection between the vehicle display device and the passenger's terminal based on the terminal information of the vehicle display device. In some embodiments, the connection establishing module 520 may initiate the process of establishing the connection with the vehicle display device automatically while the I/O module 510 receives the terminal information of the vehicle display device. In some embodiments, when the I/O module 510 receives the terminal information of the vehicle display device from the processing engine 112, the connection establishing module 520 may initiate the process of establishing the connection with the vehicle display device by receiving a command to initiate the process of establishing the connection with the vehicle display device input by a user (e.g., the service requestor). For example, after receiving the notification to remind the service requestor to establish a connection between the passenger's terminal and the vehicle display device, the passenger's terminal may display a button of "YES" to initiate the process and a button of "NO" to refuse to initiate the process. The service requestor may press the button of "YES" to input a command to initiate the process of establishing the connection with the vehicle display device. The connection establishing module 520 may initiate the process of establishing the connection with the vehicle display device in response to the command.

In step 506, the I/O module 510 may send multimedia contents in the third terminal to the first terminal via the connection.

The multimedia contents may include texts, images, video stream, audio tracks, graphics, or the like, or the combination thereof. In some embodiments, the multimedia contents in the passenger's terminal received by the vehicle display device may be played in the vehicle display device.

In some embodiments, the I/O module 510 may access the one or more storage media to read multimedia contents stored therein, encode the multimedia contents to structured data and send electronic signals encoding the structured data to the vehicle display device via the connection. In some embodiments, the connection between the passenger's terminal and the vehicle display device is limited to unidirectional sending the multimedia data from the passenger's terminal to the vehicle display device. Alternatively, the connection between the passenger's terminal and the vehicle display device may be bidirectional sending multimedia data from the passenger's terminal to the vehicle display device.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process/method 500.

Figure 6:
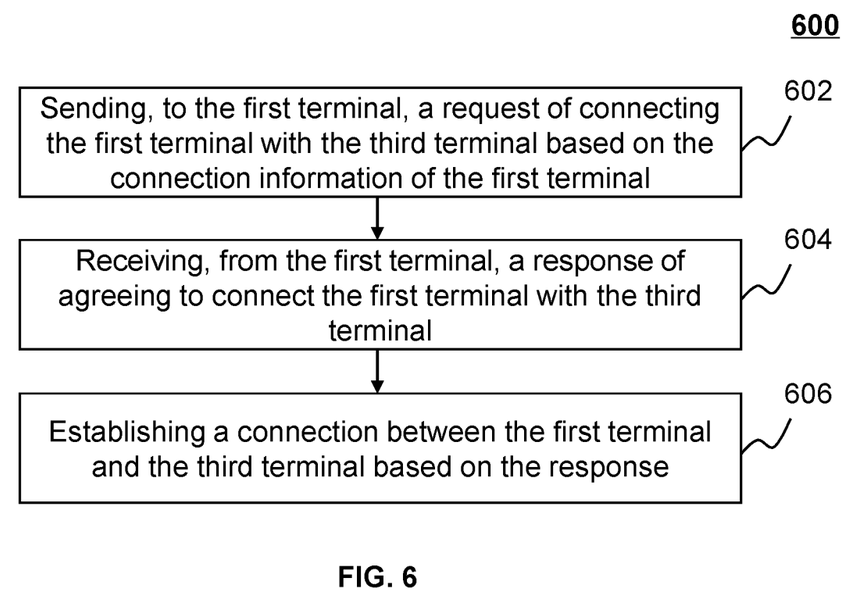
FIG. 6 is a flowchart illustrating an exemplary process for initiating a process of establishing a connection between two terminals according to some embodiments of the present disclosure.

FIG. 6 is a flowchart illustrating an exemplary process/method 600 for initiating a process of establishing a connection between two terminals according to some embodiments of the present disclosure. The process and/or method 600 may be executed by the requestor terminal 130 (e.g., the passenger's terminal) in the server 110. For example, the requestor terminal 130 may be implemented on the computing device 200 in FIG. 2. The process and/or method 600 may be implemented as a set of instructions (e.g., an application) stored in the storage ROM 230 or RAM 240. The processor 220 may execute the set of instructions and may accordingly be directed to perform the process and/or method 600. The operations of the illustrated process/method presented below are intended to be illustrative. In some embodiments, the process/method may be accomplished with one or more additional operations not described, and/or without one or more of the operations discussed. Additionally, the order in which the operations of the process/method as illustrated in FIG. 6 and described below is not intended to be limiting. In some embodiments, the process and/or method 600 may initiate the process in step 504 in the process and/or method 500.

In step 602, the I/O module 510 may send, to the first terminal, a request of connecting the first terminal with the third terminal based on the terminal information of the first terminal.

In some embodiments, the request of connecting the vehicle display device with the passenger's terminal may be a notification to remind the driver to connect the vehicle display device with the passenger's terminal.

In some embodiments, the I/O module 510 may send, to the vehicle display device, request signals including a first portion encoding the request of connecting the vehicle display device with the passenger's terminal based on the terminal information of the vehicle display device and a second portion encoding the terminal information of the vehicle display device.

In step 604, the I/O module 510 may receive, from the first terminal, a response of agreeing to connect the first terminal with the third terminal.

In some embodiments, after receiving the request of connecting the vehicle display device with the passenger's terminal, the vehicle display device may generate a response of agreeing to connect the vehicle display device with the passenger's terminal based on a command input by a user (e.g., the driver). For example, after the vehicle display device receives the request of connecting the vehicle display device with the passenger's terminal, the vehicle display device and/or the driver's terminal may display a button of "YES" to agree to connect with the passenger's terminal and a button of "NO" to refuse to connect with the passenger's terminal. The driver may press the button of "YES" to input a command of agreeing to connect with the passenger's terminal. The vehicle display device may generate a response of agreeing to connect with the passenger's terminal in response to the command. In some embodiments, after receiving the request of connecting the vehicle display device with the passenger's terminal, the vehicle display device may generate a response of agreeing to connect the vehicle display device to the passenger's terminal automatically.

In some embodiments, the I/O module 510 may receive, from the vehicle display device, response signals including a first portion encoding the response of agreeing to connect the vehicle display device with the passenger's terminal and a second portion encoding a command to direct the connection establishing module 520 to establish a connection between the vehicle display device and the passenger's terminal.

In step 606, the connection establishing module 520 may establish a connection between the first terminal and the third terminal based on the response.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process/method 600.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

I claim:

1. A system of electronic device configured to operating an online transportation service platform, comprising:
a bus;
one or more storage media electronically connected to the bus, comprising a set of instructions for assisting two other terminals to establish connections therebetween; and
logic circuits configured to communicate with the one or more storage media via the bus, wherein when executing the set of instructions, the logic circuits are directed to:
receive first electronic signals from a second terminal, the first electronic signals including first structured data encoding terminal information of a first terminal associated with the second terminal;
receive second electronic signals including second structured data encoding an identification of a third terminal; and
send third electronic signals to the third terminal, the third electronic signals including third structured data encoding the terminal information of a display device of the first terminal, wherein the third structured data includes a first portion encoding the identification of the third terminal, a second portion encoding the terminal information of the display device of the first terminal including a short-range connection ID and password of the display device of the first terminal, a third portion encoding a command to direct the third terminal to initiate a process to establish a connection with the display device of the first terminal via a short-range connection based on the terminal information of the display device of the first terminal, so that a transportation service requestor directly accesses video data played on the display device, wherein the video data played on the display device is received from the third terminal.

2. The system of claim 1, wherein the first terminal is associated with a vehicle, the second terminal is associated with a transportation service provider, and the third terminal is associated with the transportation service requestor; and
the logic circuits are further directed to determine that the service provider is providing a transportation service to the service requestor.

3. The system of claim 1, wherein the first structured data includes a first portion encoding an identification of the first terminal, and
a second portion encoding connection information of the first terminal.

4. The system of claim 3, wherein the connection information includes an authorization code to enable the first terminal to accept a connection request from the third terminal.

5. The system of claim 1, wherein the third structured data include a third portion encoding a command to direct the third terminal to initiate a process to establish a communication connection with the first terminal based on the terminal information of the first terminal.

6. The system of claim 5, wherein the communication connection between the third terminal and the first terminal is limited to unidirectional sending multimedia data from the third terminal to the first terminal.

7. The system of claim 1, wherein the first terminal is included in the second terminal.

8. A method implemented on a computing device having one or more processors and one or more storage media, the method comprising:
receiving, by the one or more processors, first electronic signals from a second terminal, the first electronic signals including first structured data encoding terminal information of a first terminal associated with the second terminal;

receiving, by the one or more processors, second electronic signals including second structured data encoding an identification of a third terminal; and sending, by the one or more processors, third electronic signals to the third terminal, the third electronic signals including third structured data encoding the terminal information of a display device of the first terminal, wherein the third structured data includes a first portion encoding the identification of the third terminal, a second portion encoding the terminal information of the display device of the first terminal including a short-range connection ID and password of the display device of the first terminal, a third portion encoding a command to direct the third terminal to initiate a process to establish a connection with the display device of the first terminal via a short-range connection based on the terminal information of the display device of the first terminal, so that a transportation service requestor directly accesses visually or by hearing video data played on the display device, wherein the video data played on the display device is received from the third terminal.

9. The method of claim 8, wherein the first terminal is associated with a vehicle, the second terminal is associated with a transportation service provider, and the third terminal is associated with the transportation service requestor; and the method further comprising:

determining, by the one or more processors, that the service provider is providing a transportation service to the service requestor.

10. The method of claim 8, wherein the first structured data includes a first portion encoding an identification of the first terminal, and a second portion encoding connection information of the first terminal.

11. The method of claim 10, wherein the connection information includes an authorization code to enable the first terminal to accept a connection request from the third terminal.

12. The method of claim 8, wherein the third structured data include a third portion encoding a command to direct the third terminal to initiate a process to establish a communication connection with the first terminal based on the connection information of the first terminal.

13. The method of claim 12, wherein the communication connection between the third terminal and the first terminal is limited to unidirectional sending multimedia data from the third terminal to the first terminal.

14. An electronic terminal, comprising:

one or more storage media comprising a set of instructions for connecting to another terminal device associated with an on-demand transportation platform; and one or more processors configured to communicate with the one or more storage media, wherein when executing the set of instructions, the one or more processors are directed to:

receive first electronic signals from a computer server, the first electronic signals including first structured data encoding terminal information associated with a target terminal; and generate second electronic signals to initiate a communication connection between the target terminal and the electronic terminal based on the terminal information of a display device of the target terminal, wherein the second structured data includes a first portion encoding the terminal information of a display device of the target terminal including a short-range connection ID and password of the display device of the target terminal, a second portion encoding a command to direct the electronic terminal to initiate a process to establish a connection with the display device of the target terminal via a short-range connection based on the terminal information of the display device of the target terminal, so that a user directly accesses video data played on the display device, wherein the video data played on the display device is received from the electronic terminal.

15. The electronic terminal of claim 14, wherein the computer server is associated with an online on-demand transportation service platform;

the target terminal is associated with a terminal of a transportation service provider who is providing a transportation service to the user of the electronic terminal.

16. The electronic terminal of claim 14, wherein the first structured data includes:

a first portion encoding an identification of the target terminal, and a second portion encoding connection information of the target terminal.

17. The electronic terminal of claim 16, wherein the connection information includes an authorization code to enable the target terminal to accept a connection request from the electronic terminal.

18. The electronic terminal of claim 14, the one or more processors are further directed to:

access the one or more storage media to read multimedia contents stored therein;

encode the multimedia contents to second structured data; and send third electronic signals encoding the second structured data to the target terminal via the communication connection.

19. The electronic terminal of claim 14, wherein the communication connection between the electronic terminal and the target terminal is limited to unidirectional sending multimedia data from the electronic terminal to the target terminal.

20. The electronic terminal of claim 14, wherein to initiate the communication connection between the target terminal and the electronic terminal the one or more processors are directed to:

send, to the target terminal, fourth electronic signals encoding a request of connecting the target terminal with the electronic terminal based on the terminal information of the display device of the target terminal;

receive, from the target terminal, fifth electronic signals encoding a response of agreeing to connect the target terminal with the electronic terminal; and establish the communication connection between the target terminal and the electronic terminal based on the response.

* * * * *